INVENTOR.
Oswald M. Bundy
and
BY Joseph P. Finley
Harry P. Canfield
Attorney

INVENTOR.
Oswald M. Bundy
and
BY Joseph P. Finley
Harry R. Canfield
Attorney

INVENTOR.
Oswald M. Bundy
and
BY Joseph P. Finley
Harry P. Canfield
Attorney

United States Patent Office
2,947,827
Patented Aug. 2, 1960

2,947,827

CAM-OPERABLE TWIN-SWITCHES

Oswald M. Bundy, Cleveland Heights, and Joseph P. Finley, Cleveland, Ohio, assignors to The Clark Controller Company, Cleveland, Ohio, a corporation of Ohio Filed Nov. 29, 1957, Ser. No. 699,686

4 Claims. (Cl. 200—16)

The invention hereof relates to electric switches of the general class that make and break electric control circuits; and that can be operated to select one or more of a plurality of control circuits to be made or broken; and that are sometimes referred to as selector switches.

Switches of this class are known in which a reciprocatory switch element is reciprocated up and down (in one position of use) by a rotary cam; and the cam positions the switch element in an upper or lower or intermediate position at different selected rotational points of the cam and on going to each position the switch element cooperates with stationary contacts to effect selective energization or deenergization of control circuits connected to the stationary contacts.

The development of the art of electric controls has rendered them highly diverse and complex and the commercial demand for selector switches by which such complex controls can be selectively actuated and meet all commercial requirements has led to the development of selector switches of twin-switch type, comprising two reciprocatory contact operating switch elements, both reciprocable in parallel lines of reciprocation by the same cam, and each reciprocable independently of the other.

A cam operated twin-switch of this type is described in copending patent applications, Serial Number 699,640 and Serial Number 625,968, the latter now abandoned, both assigned to the assignee of the present invention. These applications explain the great number of cams that must be provided to meet all commercial requirements and are directed particularly to improved constructions of the cams and methods of making them.

The subject matter of the present application is a cam operable twin-switch itself, and may be considered as substantially the same as the twin-switch described in said copending applications.

The twin-switch invention hereof is described in general in the immediately following description; a more detailed description to follow later; the actual invention being that set forth in the appended claims.

The twin-switch comprises an elongated housing molded from electrical insulating material.

Considered in an upright position as in Figs. 1 and 3 later to be referred to, it is rectangular in horizontal cross section, and comprises vertical outer walls on four sides, and a bottom wall and is open at the top. It has a vertical interior wall that in general divides it into like right and left halves.

It has interior upper and lower horizontal walls spaced apart, in each half. Upon them respectively are mounted upper and lower pairs of horizontally spaced stationary contacts, having portions extending out of the housing on the right and left sides, with circuit connection terminals thereon. In each half, there are vertically alined openings in the horizontal interior walls, and an elongated switch reciprocator, molded from insulating material extends vertically through each opening, and the peripheries of these openings together with portions of the side walls, guide the reciprocators for vertical reciprocation.

The upper end of each reciprocator is formed to be a cam follower; and a spring is provided reacting between the bottom wall and a lower portion of the reciprocator, to yieldably hold the cam follower upwardly against a rotary cam, having cam surfaces to reciprocate the reciprocator by rotation thereof.

The portion of each reciprocator between the horizontal interior walls, carries a bridging contact, which upon reciprocation and positioning of the reciprocator by the cam, bridges the upper or lower stationary contacts or takes up a middle position between them.

The bridging contact is a flat sheet metal stamping, and projects forwardly from the reciprocator, and is mounted loosely thereon by telescoping a perforation in its rearward portion over a depending post on the reciprocator, and is held on the post and against a horizontal surface at the base of the post by the aforesaid reciprocator spring.

The forward part of the bridging contact is free to rock up or down on the post to engage and bridge the stationary contacts as aforesaid, and therefore does so with a wiping action, and is held in engagement with the contacts by pressure of the reciprocator spring.

The upper end of the housing as a whole is open and is preferably squared off to engage upon a surface of a cam housing, to which it is secured by through screws projected upwardly from the bottom of the housing through screw holes in the housing.

The objects of the invention are:

To provide generally an improved construction of twin-switch, operable by a rotary cam;

To provide a switch comprising the features of improvement set forth in the foregoing general description, singly or in combination.

An embodiment of the invention is disclosed in detail in the following description taken in connection with the accompanying drawing.

As referred to hereinbefore, the twin-switch invention hereof is operated by a rotary cam; and therefore, in order that certain features of construction and operation of it may be fully described, it is deemed necessary to illustrate and describe an exemplary cam in operative relation to the twin-switch.

Figures 1, 2, 3, 4, 5:
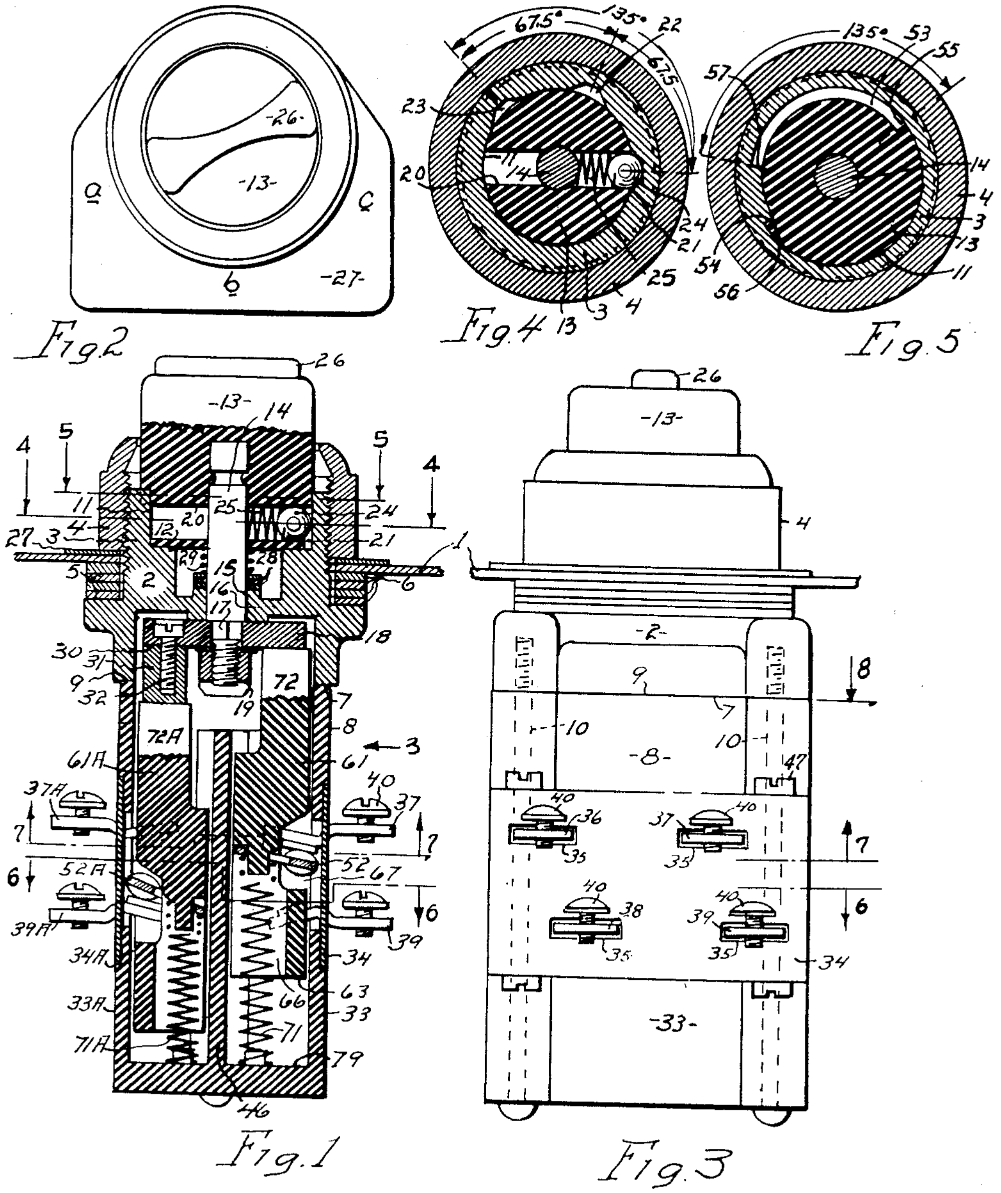
Fig. 1 is a longitudinal sectional view of a switch embodying the invention, and of a cam structure for operating it.
Fig. 2 is a top plan view of the upper part of the embodiment of Fig. 1.
Fig. 3 is an elevational view of the parts of Fig. 1, from the direction of the arrow 3 of Fig. 1.
Figure 6:
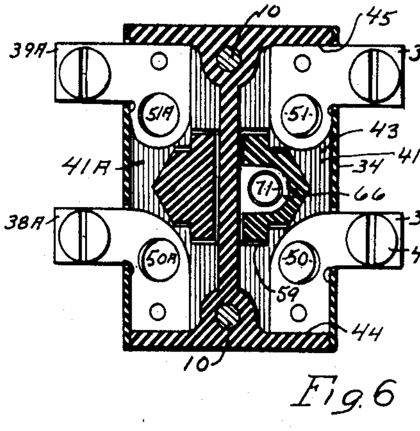
Figure 7:
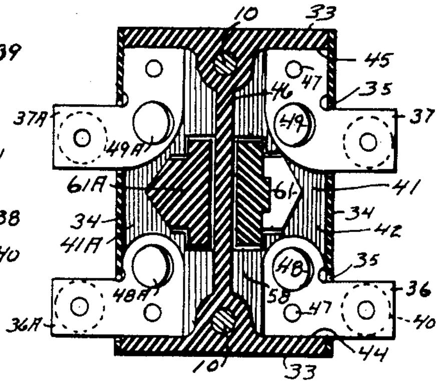
Figure 10:
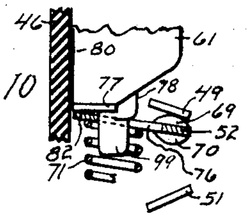
Figure 8:
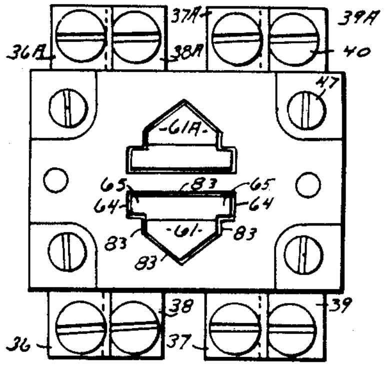
Figure 11:
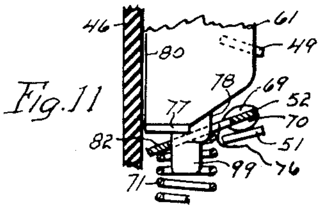
Figure 12:
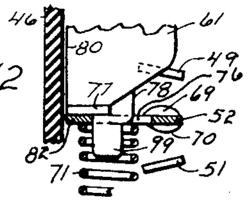
Figure 9:
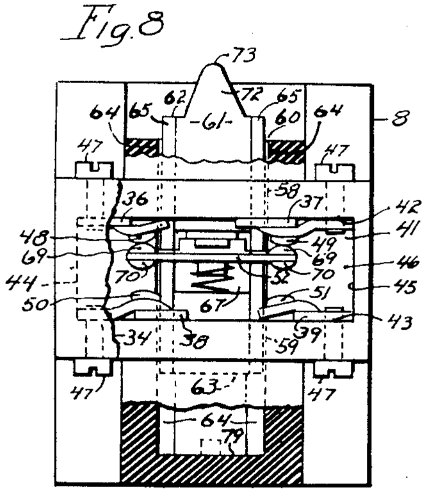
Figure 13:
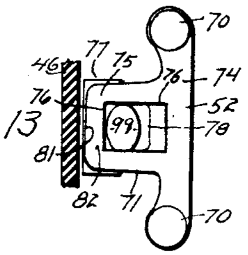
Figure 14:
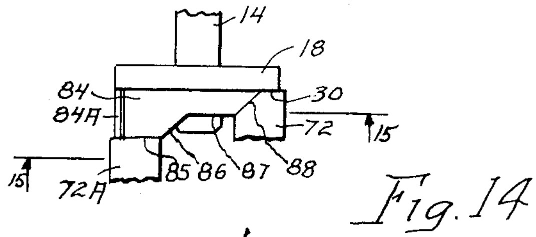
Figure 15:
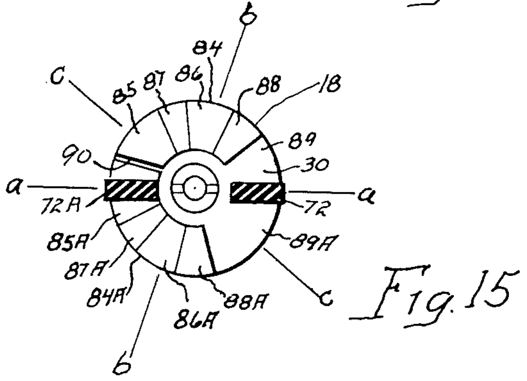

Figs. 4 and 5 are respectively cross sectional views from the planes 4 and 5 of Fig. 1;

Figs. 6 and 7 are respectively cross sectional views from the planes 6 and 7 of Fig. 1;

Fig. 8 is a top plan view of the switch without the cam structure taken from the plane 8 of Fig. 3;

Fig. 9 is a view of the switch alone corresponding to the switch of Fig. 3, but with an insulation cover plate removed and with parts broken away and in section;

Fig. 10 is a fragmentary view of a part of Fig. 1 to enlarged scale;

Figs. 11 and 12 are views of the parts of Fig. 10 in different operative positions;

Fig. 13 is a bottom plan view of the parts of Fig. 12; with a spring omitted;

Fig. 14 is a front elevational view of parts shown in section in Fig. 1;

Fig. 15 is a view from the plane 15 of Fig. 14.

Referring to the drawing, Figs. 1 and 2, a sheet metal panel 1 is shown on which an embodiment of the invention is mounted; the panel being considered as in a horizontal plane. This is for convenient reference in the following description; the panel in practice being more usually vertical.

A generally tubular mounting head 2 has an externally threaded shank 3 extending upwardly through a hole in the panel, and a tubular nut 4 on the shank clamps the panel between the nut and a shoulder 5 on the head, to rigidly mount the head on the panel.

Spacing washers are shown at 6—6 between the panel 1 and the shoulder 5 whereby different thicknesses of panel may be accommodated.

The head 2 has a lower transverse plane surface 7; and a switch structure comprising a walled housing 8 molded from insulating material has an end 9 thereof squared off in a plane and abutting upon the head surface 7; and is rigidly secured to the head by two bolts 10—10 going up through the housing and screwed into the head, Figs. 3, 6, 7.

The upper end of the shank 3 has a cylindrical recess 11 therein, with a transverse bottom 12, in which is a cylindrical rotatable handle 13 of knob form, molded from insulating material and having a coaxial shaft 14 molded in it which extends below it through an aperture 15 in a transverse wall 16 of the head below the recess bottom 12.

Below the transverse wall 16 the shaft 14 has a square shank 17 fitting in a square hole in a circular disc-form cam base 18 to be referred to, and a nut 19 below the base 18 clamps it upon the shaft 14 at the shoulder provided by forming the square shank.

The knob handle 13 is held against moving axially outwardly by the disc base 18 engaging the underside of the transverse wall 16; and against moving axially inwardly by its own engagement with the bottom 12 of the cylindrical recess 11.

The handle 13 has a transverse cylindrical bore 20 near its lower end, and axially opposite thereto in the inner wall of the cylindrical recess 11, are indentations 21—22—23 spaced circumferentially, Fig. 4; and a ball 24 in the bore 20 is spring pressed toward the indentations by a spring 25 in the bore reacting between the ball 24 and the side of the coaxial shaft 14.

Upon rotation of the handle 13, the ball 24 will be projected into or will ride out of the indentations, and when in any one of them will yieldably hold the handle in a corresponding rotated position.

The three indentations, 21—22—23 are spaced 67.5 degrees apart, or 135 degrees between the outer two extreme indentations 21 and 23 as shown in Fig. 4 and they determine three rotative positional "points" for the handle.

The handle 13 as illustrated in Figs. 1 and 4 is at one extreme point determined by the indentation 21, and upon rotating it counterclockwise as viewed in Fig. 4, it may be put at the other two points selectively.

For convenience of reference to indicate the points of the handle, it has on its top a diametrically elongated rib 26 pointing longitudinally to three point positions, indicated by legends *a*, *b* and *c*, provided on a sheet metal apron 27, Figs. 1 and 2, clamped upon the panel 1 by the nut 4. Other legends with operative meaning may be used.

The ball 24 tends to drop into said indentations when it arrives at them and they substantially fit the ball, so that they center it therein and cause the handle to come accurately to said points.

In order to insure that the handle will not be rotated beyond the extreme points *a* and *c*; positive stop means is provided to stop it at these points; comprising a portion of the circumference of the handle within the recess 11 cut back to a smaller radius as at 53, Fig. 5, providing shoulders 54—55 engageable respectively with corresponding shoulders 56—57 on the head 2, the shoulders being spaced so that the shoulder 56 engages the shoulder 54 at one extreme position, and so that the shoulder 55 will engage the shoulder 57 after rotation through 135 degrees to the other extreme position.

The shaft 14 is sealed in its aperture 15 by sealing washers 28—28, on the transverse wall 16, closely fitting around the shaft 14, and compressed upon the wall 16 and expanded into pressure contact with the shaft 14, by a spring 29 reacting between the washers 28 and the lower end of the knob handle 13.

The cam base 18 rotates with the handle 13 as will be apparent, and it has a plane base surface 30 on its under side at right angles to the rotational axis, upon which are to be superimposed cam parts, detachably mounted thereon by screws going through holes in the cam base and into the cam parts, one such cam part and its screw being shown at 31 and 32 in Fig. 1.

The cam is shown more completely in Figs. 14 and 15 to be referred to and is representative of a great number of different cams which may be used, for example those illustrated and described in said copending application Serial No. 699,640.

The cam operates a switch in the housing 8, and the cam will be further described after the following description of the switch itself.

The switch housing 8 is generally rectangular, as shown in the drawing and has opposite front walls 33—33A as viewed in Fig. 1, on which are thin plates 34—34A of insulation, provided with perforations 35—35 telescoped over circuit terminals 36 to 39 projecting laterally from one side, and terminals 36A to 39A projecting from the other side, the terminals having circuit wire attaching screws 40—40.

When the plates 34—34A are removed, they uncover alike chambers 41—41A in the sides of the housing as shown for one chamber 41, Fig. 9, and indicated for both chambers in Figs. 6 and 7.

Each of the chambers, for example the chamber 41 has a top wall 42, bottom wall 43, opposite end walls 44—45, and a back wall 46.

Further as to the exemplary chamber 41, two of the said terminals, 38—39 are mounted on the bottom wall 43 and the two 36—37 on the top wall 42, by screws 47 going through the said walls and screwed into the terminals.

The terminals 38—39 on the bottom wall 43 are staggered laterally with respect to the terminals 37—38 on the top wall 42, to give screw driver access to the terminal screws on the lower terminals, as will be apparent in Fig. 3.

The upper terminals 36—37 have contact tips 48—49 on their undersides confronting, respectively contact tips 50—51 on the upper sides of the lower terminals 38—39.

There is thus a pair of upper and a pair of lower tips for each pair in a transverse plane.

A movable bridging contact 52 is provided to move upwardly or downwardly to bridge one or the other pair of tips; or to move to a middle position; and a description of its mounting and movement follows.

The top and bottom walls 42 and 43 of the exemplary chamber 41 have vertically aligned apertures 58—59 therethrough; the upper aperture 58 continuing upwardly beyond the top chamber wall 42 and being upwardly open as at 60, Fig. 9, and the lower aperture 59 continuing downwardly beyond the bottom chamber wall 43 to the bottom of the housing and being closed thereat by a bottom housing wall 79.

The arrangement provides generally a vertical well. A reciprocator 61 molded from insulating material is disposed in the well thus provided, being inserted downwardly into the upper open end 60 of the well; and reciprocates therein to different positions, and in the position illustrated, its upper end projects out of the upper end of the well as at 62, Fig. 9, and at its lower end it terminates above the bottom wall 79 as at 63, Figs. 1 and 9.

The well has vertical parallel grooves 64—64 at its opposite sides and the reciprocator 61 has parallel guide ribs 65—65 on its opposed sides in the grooves, to guide the reciprocator for vertical rectilinear movement.

The back side of the reciprocator 61, at its lower portion has a rearwardly open channel 66 therein; and at its longitudinally intermediate portion, the front of the reciprocator has a recess 67 therein Fig. 1, communicating rearwardly with the upper end of the channel 66.

The intermediate portion of the reciprocator at the rear of the forwardly open recess 67, has a downwardly projecting post construction 78 to be more fully described, aligned with the channel 66.

The aforesaid bridging contact 52, made of flat sheet metal, also to be more fully described, has an aperture 76 therein telescoped over the post construction 78; and extends forwardly therefrom through the forwardly open recess 67 of the reciprocator and carries pairs of contact tips 69—69 and 70—70 substantially in vertical alignment with the said upper and lower tips 48—49 and 50—51 of the terminals.

A vertical coil compression spring 71, Fig. 1, is disposed in the reciprocator channel 66, reacting at its lower end upon the housing bottom wall 79 and at its upper end upon the underside of the bridging contact 52, yieldably holding the contact on the post construction 78, and also exerting upward spring thrust on the reciprocator 61, tending at all times to move it upwardly.

The upper end portion of the reciprocator 61 is tapered as at 72 and rounded as at 73; and the end constitutes a cam follower 72; being held in engagement with camming and positioning surfaces on the above mentioned cam, to be described, by the thrust of the spring 71 on the reciprocator.

The said post construction 78 may be considered in general as extending downwardly from the upper wall of the recess 67 in the front of the reciprocator Fig. 1; and the following description of its construction and mode of operation may be referred to Figs. 10 to 13.

In Figs. 10, 11, 12 the said stationary upper and lower tips of the terminals 37 and 39 are indicated, somewhat diagrammatically at 49 and 51, and relative thereto, the Figures 10, 11, 12 illustrate respectively upper, lower and middle positions of the reciprocator 61 and the bridging contact 52 carried thereby.

The bridging contact 52 of Figs. 10, 11, 12 is best shown in bottom plan in Fig. 13, with the spring 71 of Figs. 10, 11, 12 omitted. It is made of flat sheet metal and comprises an elongated bridging portion 74 at its front, carrying aforesaid contact tips 70—70 on its lower side (the tips 69—69 on its upper side appearing in Figs. 10, 11, 12). A rearward extension 75 on the bridging portion 74 has said aperture 76 therethrough.

The reciprocator 61 has a flat plate-like horizontal base 77, and a post 78 of rectangular section depending below it.

The aperture 76 of the bridging contact is rectangular as shown in Fig. 13, and is telescoped over the post 78, with a clearance fit, which prevents rotation of the bridging contact.

The spring 71 reacts on the under side of the bridging contact and in the middle position of the reciprocator, Fig. 12, holds it flat against the horizontal base 77, and therefore maintains it in a horizontal middle position between the contact tips 49 and 51.

When the reciprocator is moved upwardly by the spring 71 from Fig. 12 to Fig. 10, the tips 69 of the contact 52 engage the upper stationary tips 49 (and 48, see Fig. 9) in the first part of its movement, and its rear end is held against the base 77 by the spring 71.

Upon continued movement of the reciprocator, after the contact tips 69 first engage the tips 49 (and 48) the bridging contact 52, pressed upwardly by the spring 71, has a circular movement of short radius bodily around its rear end, and this causes a highly desirable improved wiping action of its tips on the stationary tips.

When the reciprocator goes to the downward position, to Fig. 11, a similar rocking of the bridging contact 52 accompanied by wiping action on the lower contact tips 70 occurs, except that in this case the bridging contact 52 hinges on the forward edge of the rectangular base 77.

The spring 71 besides functioning, as described, to constrain the reciprocator 61 to tend to move upwardly; and to hold the bridging contact 52 against the base 77; also provides pressure engagement between the engaged contacts during and after wiping them.

The rectangular post 78 is extended downwardly in a post portion 99 inside of the spring 71 to prevent excessive sidewise shifting of the upper end of the spring.

It will be noted that the back side of the reciprocator 61 is close to the back wall 46 of the said well with small clearance at 80, in Figs. 10 to 13, to be referred to again later; and that the rear edge 81 of the bridging contact as shown best in Fig. 13 is rectilinear and parallel to the said back wall, and that the bridging contact in the portion 82 between its perforation 76 and its rear edge 81, is proportioned to fit loosely between the back wall 46 and the post 78; and is at all times trapped therebetween, whereby the bridging contact is prevented from shifting forwardly or rearwardly.

As mentioned, the reciprocator 61 and the walls of the well, for example the walls 64 in which it reciprocates, are made from the insulating material by molding; and therefore draft must be provided in the mold; and the walls of the well will be tapered by the draft; and since the reciprocator must reciprocate freely and rectilinearly, the clearance between it and the walls of the well must be preselected to avoid either too much looseness or binding.

In Fig. 8 this clearance has been shown at 83—83 all around the reciprocator and magnified for clarity.

The switch as illustrated is approximately one-and-one-half times the actual size of a commercially acceptable switch; and for a switch of actual size it has been found that if this clearance is not less than .010″ nor more than .018″ satisfactory operation will be had.

In the foregoing, the right hand half of the switch as viewed in Fig. 1 has been described.

The left hand half has the same construction and identical associated parts as will be apparent from the drawing, and like parts are in some instances given the same reference characters with the suffix A to identify them.

The switch therefore is a twin switch with two independently movable bridging contacts, 52—52A, movable to either of three positions, upper, lower and middle, and is a three-position twin-switch of the premises.

The two cam followers 72 and 72A are held by their springs 71 and 71A toward their upper positions in engagement with the cam, by which upon rotation of the cam, the reciprocators are reciprocated and positioned for the described purposes.

As of the premises, the three position twin-switch described above may be operated by any one of many cams of different characteristics; to variously position the switch reciprocators; and for illustrative purposes a cam has been chosen, see Figs. 14 and 15, which when rotated by the handle 13 to the point *a* will position the right and left reciprocators 61—61A at their upper and lower positions respectively, as viewed in Fig. 1; and on point *b* will position them both at their middle positions; and on point *c* will position the right and left reciprocators at their lower and upper positions respectively.

The cam comprises two alike cam parts 84 and 84A, and the cam base 18 on the lower plane surface 30 of which the parts are superimposed, and detachably secured as described.

The cam part 84, Figs. 14 and 15, is curved in the general form of part of an annulus, coaxial with the base and lies upon the base; and proceeding circumferentially thereof has a plane positioning face 85 at a relatively high level above the base surface 30; a positioning face 86 at a lower or middle level, and an inclined camming face 87 between them, and an inclined camming face 88 between the face 86, and an exposed portion 89 of the base surface 30 which constitutes a low level of the cam.

The cam part 84A is like the cam part 84 except that the parts 84 and 84A are "rights" and "lefts" and the surfaces on the part 84A therefore have been given the same reference characters as the part 84 with the suffix A.

The two parts as shown have their high level faces 85 and 85A adjacent to each other, with a small gap 90 therebetween.

The cam is shown in Fig. 15 when the handle is on point *a* and with the cam follower 72 on the low level base portion 89, and the cam follower 72A on the high level face 85A, as in Fig. 1.

When the cam is rotated to the point *b*, the cam follower 72 will ride up onto the middle level face 86, and when rotated to the point *c* will ride up onto the high level face 85.

At the same time the cam follower 72A will descend successively to the middle level face 86A and the low level 89A on the base surface.

The operation of the switch will be apparent from the foregoing description, but is summarized here for convenient reference.

The two elongated reciprocators 61 and 61A are guided in the housing to reciprocate vertically in parallel directions; and carry respective bridging contacts 52 and 52A.

The upper ends of the reciprocators acting as cam followers, are at all times held in engagement with a rotary cam by compression springs reacting between the reciprocators and the housing.

It is intended that the switch will be assembled with a rotary cam, in two halves, each half having cam follower position faces, which reciprocate the reciprocators, each independently of the other; and position them when the cam is rotated.

The cam is rotatable to predetermined points, and at each point, the cam halves move the reciprocators independently of each other to positions determined by the design of the cam.

Pairs of stationary contacts are mounted on the housing above and below the bridging contacts on the reciprocators, to be engaged or disengaged thereby when the reciprocators are positioned by the cam halves.

Control circuits are to be connected to the pairs of stationary contacts.

At different times the cam may be rotated to one or another of its points selectively and at that point its cam halves will position the reciprocators, to energize or deenergize control circuits selectively, by their bridging contacts.

According to the design of the cam halves, and the numbers and disposition of the cam rotative points, each reciprocator and its bridging contact may be selectively positioned in any one of three positions, upper, lower or intermediate; or may be selectively positioned in either of only two positions, which may be the upper and lower positions, or the upper and intermediate position, or the lower and intermediate position; or one reciprocator can be maintained always in one position, while the other is moved to selected positions.

It is needless to add that the cam being separate from the switch, a great number of different cams having different designs and combinations of cam halves are interchangeable, in operative relation to the switch; so that the switch is adaptable to meet all commercial requirements as to the circuits it is to selectively control.

In the foregoing description of a "twin-switch," the switch is of a particular structural form, comprising a one piece housing that may be considered as in two parts, side-by-side on the right and left sides of a vertical center line.

This particular form of housing is not essential in the practice of the invention. It has been chosen for descriptive purposes herein because it is adapted, in the simplest manner, to contain two parallel reciprocating elements each operating a plurality of contacts in the line of its reciprocation, and both elements reciprocated by a cam or cams, each independently of the other; and because the contacts in each line of reciprocation may be of the simplest arrangement, namely an upper and lower pair with a single bridging contact between the pair.

The term "twin-switch" as used herein, particularly in the claims, is therefore intended to mean any switch having these two parallel lines of independent reciprocation, in each of which lines, contacts are engaged or disengaged by the reciprocation, and not limited in its meaning to any particular form or structural arrangement of housing, nor to contacts and a single bridging contact in each line of reciprocation.

We claim:

1. An electric switch comprising, a housing of insulating material having a chamber formed therein; an elongated reciprocator disposed for reciprocable movement in the chamber; a first and second pair of stationary contacts mounted in spaced apart relationship on the housing at one side of the reciprocator axis; a bridging contact on the reciprocator to be moved therewith between the first and second pairs of stationary contacts; a spring reacting between the housing and the bridging contact to retain the bridging contact on the reciprocator, and the spring yieldably biases the reciprocator in one direction causing the bridging contact to engage the first pair of stationary contacts under pressure, and the spring also permits the bridging contact to be rocked relative to the reciprocator when the contacts engage causing the bridging contact to wipe on the engaged stationary contacts.

2. An electric switch comprising, a housing of insulating material having a chamber formed therein; an elongated reciprocator for reciprocable movement in the chamber; a first and second pair of stationary contacts mounted in spaced apart relationship on said housing and at one side of the reciprocator axis; a free-end post having a transverse base formed on the reciprocator; a bridging contact having an aperture therein for loosely fitting over the post and to position the bridging contact between the first and second pair of stationary contacts; a spring reacting between the housing and the bridging contact to retain the bridging contact over the post and against the base, and the spring yieldably biases the reciprocator in one direction causing the bridging contact to engage the first pair of stationary contacts under pressure, and the spring also yieldably permits the bridging contact to be rocked on the transverse base when the contacts engage causing the bridging contact to wipe on the engaged stationary contacts.

3. A twin electric switch comprising, a housing of insulating material having two parallel side-by-side chambers formed therein; an elongated reciprocator disposed for reciprocable movement in each chamber, a free-end post having a transverse base on each reciprocator; two pair of stationary contacts mounted in spaced apart relationship on the housing outward of the axis of one reciprocator; two more pair of stationary contacts mounted in spaced apart relationship on the housing outward of the axis of the other reciprocator; a bridging contact associated with each reciprocator to be moved therewith between the outward pairs of stationary contacts, each bridging contact having an aperture therein for loosely fitting over the free-end post; a spring in each of the chambers reacting between the housing and the bridging contact to retain the bridging contact against the transverse base on the reciprocator, and each spring yieldably biasing the reciprocator in one direction causing the bridging contacts to engage one pair of the outward stationary contacts under pressure, and each spring also permits the bridging contact to be rocked on the transverse base when the contacts engage causing the bridging contact to wipe on the engaged pair of stationary contacts.

4. The electric switch as described in claim 1 and upon reciprocation of the reciprocator opposite the one direction, the bridging contact engages the second pair of stationary contacts and the bridging contact rocks with respect to the reciprocator causing the bridging contact to wipe on the engaged stationary contacts.

References Cited in the file of this patent

UNITED STATES PATENTS

| | | |
|---|---|---|
| 1,783,731 | Leppert | Dec. 2, 1930 |
| 1,853,964 | Dorgeloh | Apr. 12, 1932 |
| 2,748,208 | Koertge | May 29, 1956 |
| 2,757,361 | Cameron | July 31, 1956 |
| 2,785,241 | Watson | Mar. 12, 1957 |

FOREIGN PATENTS

| | | |
|---|---|---|
| 527,908 | Canada | July 17, 1956 |